June 30, 1964
D. C. QUIGG
3,138,808
WHEELED BOAT TRAILER
Filed Dec. 3, 1962
2 Sheets-Sheet 1
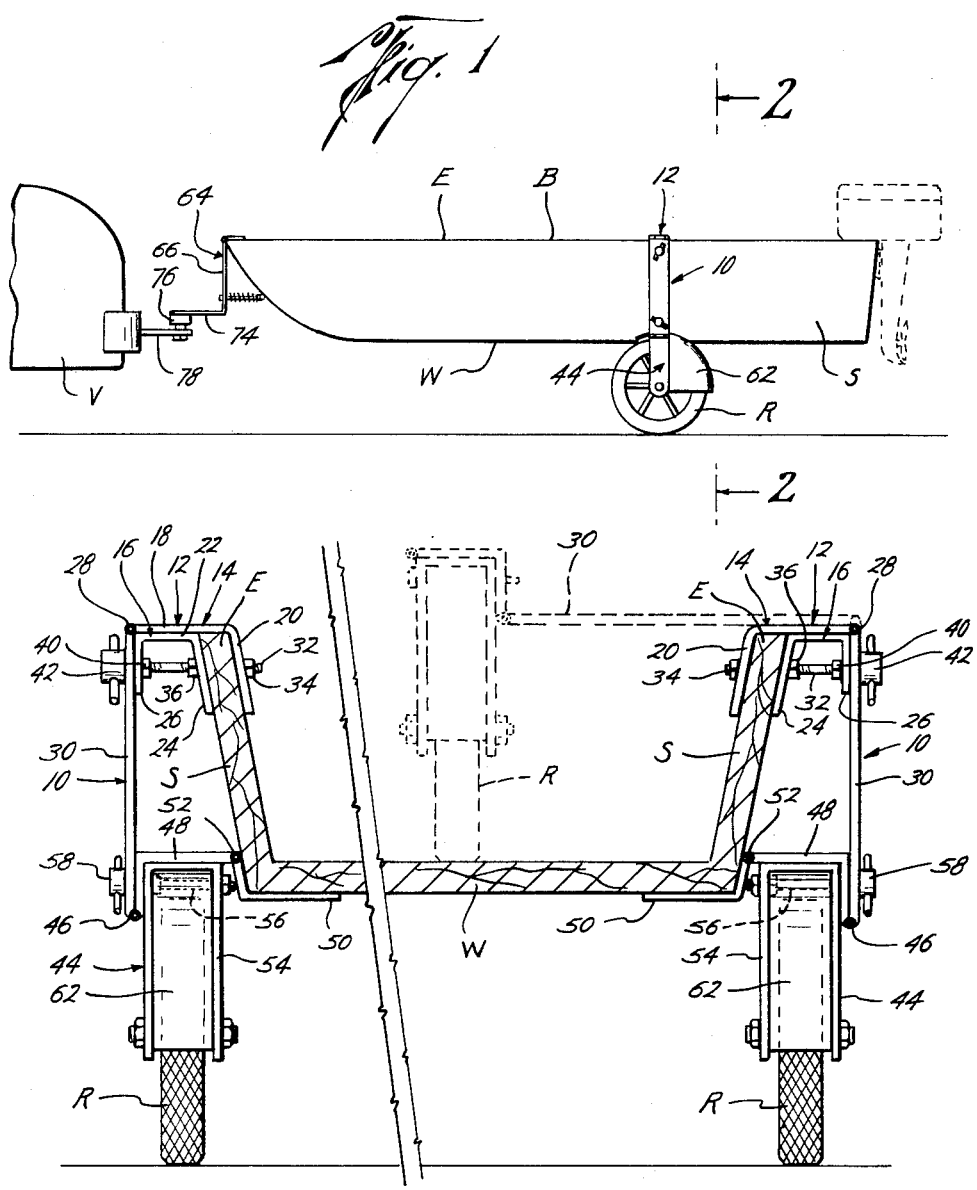
Doyle C. Quigg
INVENTOR.
BY Charles E. Lightfoot
ATTORNEY June 30, 1964
D. C. QUIGG
3,138,808
WHEELED BOAT TRAILER
Filed Dec. 3, 1962
2 Sheets-Sheet 2
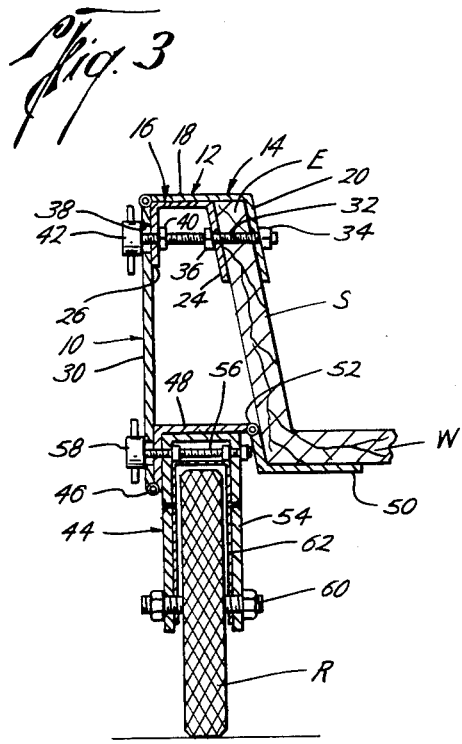
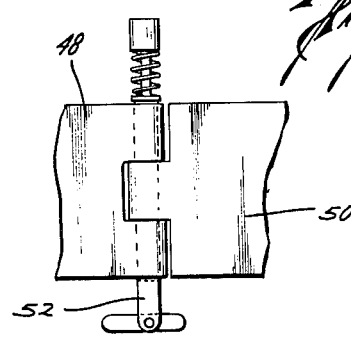
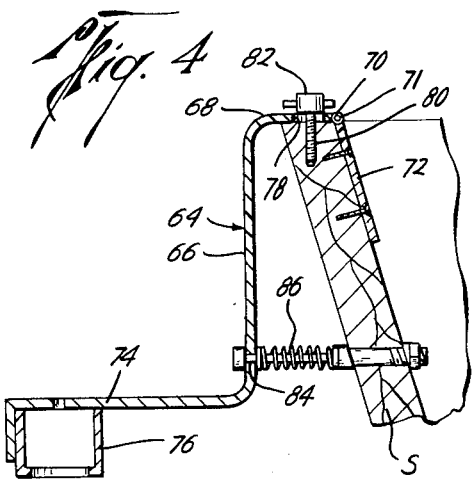
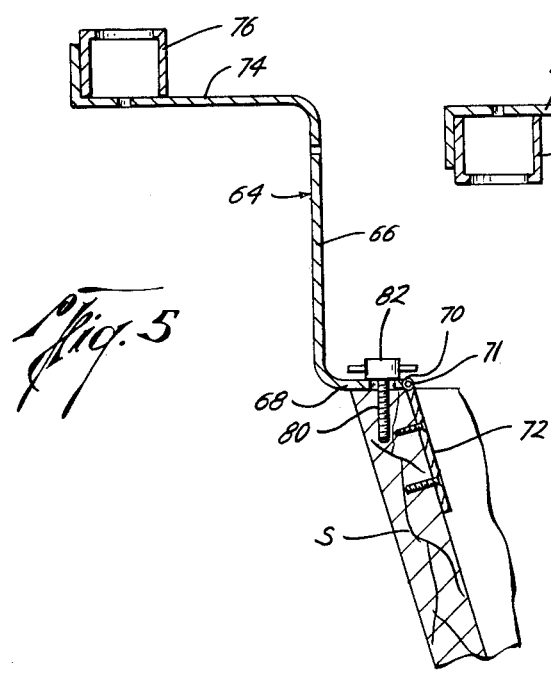
Doyle C. Quigg
INVENTOR.
BY Charles E. Lightfoot
ATTORNEY

United States Patent Office 3,138,808
Patented June 30, 1964

3,138,808
WHEELED BOAT TRAILER
Doyle C. Quigg, Houston, Tex.
(122 Tower St., Pasadena, Tex.)
Filed Dec. 3, 1962, Ser. No. 241,699
1 Claim. (Cl. 9—1)

This invention relates to boat trailers and more particularly to wheeled apparatus for attachment to a boat to enable the wheels to be positioned exteriorly of the boat to support the same for use as a trailer or moved into positions inside of the boat when the boat is to be used on the water.

The invention has for an important object the provision of means for converting a boat into a trailer to enable the boat to be conveniently towed by a motor vehicle and which may be stored in the boat when the boat is to be used on the water.

Another object of the invention is to provide wheel mounting means adapted to be readily attached to a boat and embodying hinged connections for holding the wheels in position to support the boat for use as a trailer and to permit the wheels to be swung into stored position within the boat when the boat is to be used on water.

A further object of the invention is the provision of wheel supporting means for attachment to a boat to convert the same for use as a trailer and including supporting frames, hingedly connected to the boat for swinging movement into and out of the boat and means hingedly connecting the wheels to the frames to allow the wheels to be moved to positions to support the boat for use as a trailer when the frames are moved to their external positions and to be moved into positions for engagement with the bottom of the boat to support the frames in their stored positions when the frames are moved into the boat.

Another object of the invention is the provision in boat towing apparatus of the kind mentioned of releasable connections for holding the wheel frames in their active and inactive positions and which are easily released and readjusted when the wheels are to be moved from one to the other such positions.

A further object of the invention is to provide wheeled boat supporting apparatus for converting a boat for use as a trailer, which apparatus is adapted to be easily applied to boats which are of somewhat different construction and of any width or length.

Another object of the invention is the provision of wheeled apparatus for attachment to a boat to enable the same to be used as a trailer or in the water and which is of simple design and rugged construction, capable of withstanding the extreme conditions of exposure and hard usage to which apparatus of such character is customarily subjected.

A further object of the invention is to provide apparatus for converting a boat for use as a trailer, including towing hitch mechanism which is designed for use with vehicles having attaching means located at different elevations above the ground, or with boats on which the hitch is located at different elevations.

Another object of the invention is the provision in boat trailer apparatus of the kind referred to of trailer hitch mechanism which is releasably attached to the boat to allow the hitch to be inverted to adjust the hitch to different elevations or different conditions under which the boat is to be handled.

A still further object of the invention is to provide wheel support mechanism for use in converting a boat for use as a trailer including a wheel frame and means for releasably attaching the frame to the boat at vertically spaced locations to form a strongly braced, rigid connection for supporting the boat on the wheels.

Another object of the invention is to provide adjustable wheel supporting means of the type mentioned for converting a boat for use as a trailer, which is of economical manufacture and which is easily and quickly adjusted to convert the boat for use as a trailer or to place the same in condition for use on the water.

The above and other important objects and advantages of the invention may best be understood from the following detailed specification of the same when considered in conjunction with the annexed drawings, wherein—

FIGURE 1 is a side elevational view on a reduced scale, illustrating the invention and showing the same applied to a boat in position to allow the boat to be used as a trailer;

FIGURE 2 is a cross-sectional view, taken along the line 2—2 of FIGURE 1, looking in the direction indicated by the arrows;

FIGURE 3 is a fragmentary, vertical, central cross-sectional view of one of the wheel supporting frames of the invention, showing details of structure of the same;

FIGURE 4 is a fragmentary, longitudinal, central, cross-sectional view illustrating the tow hitch of the invention and showing the same in one position of attachment to the bow of a boat;

FIGURE 5 is a view similar to that of FIGURE 4, showing the tow hitch in a reversed position on the bow of the boat; and FIGURE 6 is a fragmentary detail view, on a greatly enlarged scale, of one of the hinged connections of the invention.

Referring to the drawings in greater detail, the invention is illustrated herein in connection with its use with a boat B of conventional construction, such as an open boat having a bottom wall W and upwardly, somewhat outwardly sloping sidewalls S, it being understood that the invention may be applied with equally satisfactory results to boats of other types, or to bodies which it is desired to adapt for use as trailers.

The wheeled supports of the invention are adapted to be removably connected to the opposite sides of the boat, to adapt the same for trailer use, as best seen in FIGURE 2 of the drawings, and the equipment may also include towing hitch mechanism adapted to be removably attached to the bow of the boat and which may be adjusted to adapt the same for use with boats of different depths or with towing vehicles of different types to which the hitch may be connected at different elevations.

The wheeled supports of the invention, each generally designated 10, each comprise an upper connector member or bracket 12, which may conveniently be made in two parts 14 and 16, of which the part 14 is of angle shape, while the part 16 is of generally inverted U shape. The part 14 has a horizontally extending arm 18 adapted to be positioned over the upper edge portion E of the side of the boat, extending outwardly therebeyond, and a vertically extending arm 20 adapted to be positioned against the inner face of the side of the boat. The part 16 has a horizontal extending web 22 positioned with its upper face in horizontal alignment with the upper edge of the side of the boat in contact with the lower face of the horizontal arm 18 of the part 14, and has an inner, downwardly extending flange 24 which engages the outer face of the side of the boat and an outer, downwardly extending flange 26 spaced outwardly from the sides of the boat.

The outer end of the horizontal arm 18 of the member 14 is hingedly connected, as indicated at 28, by means of a removable hinge pin, to the upper end of an elongated support element 30, to support the element for vertical swinging movement to one position extending vertically downwardly from the connector member exteriorly of the boat and to another position extending horizontally inwardly of the boat, as best seen in FIGURE 2 of the drawings.

The connector member is clamped to the upper margin of the side wall of the boat by a bolt 32, which extends through the arm 20 of the part 14 and the flanges 24 and 26 of the part 16, and is provided with suitable nuts 34 and 36, by which the connector member may be clamped to the side of the boat. The bolt 32 is also extended outwardly through a perforation 38, as best seen in FIGURE 3, in the element 30, and the bolt is also provided with a nut 40 and a thumb screw 42, by which the element 30 may be releasably connected to the part 16 to hold the element against vertical swinging movement when the element is in its wheel supporting position. At its other end the element 30 is hingedly connected to a wheel mount, generally designated 44, as by means of a hinge 46, to allow the wheel mount, when released from the boat, to swing horizontally to one position to engage the wheel R, carried by the mount, with the ground, when the element 30 is in its wheel supporting position, and to another position to allow the wheel R to rest on the bottom of the boat inside of the same, as illustrated in dotted lines in FIGURE 2, when the element 30 is moved to its inwardly extending position in the boat.

The wheel mount 44 includes a hinge member 48 of angle shape, one arm of which is connected at its outer end to the element 30 by the hinge pin 46, and the other end of which is hingedly connected to an angle bracket 50, as by means of a removable hinge pin 52, which bracket is connected to the exterior of the bottom of the boat.

The wheel mount also includes an inverted U shaped wheel supporting member 54, attached by its web to the hinge member 48, and whose flanges are perforated close to the web thereof to receive a bolt 56, which extends through one arm of the hinge member 48 and through the element 30, just above the hinge 46, and is provided with suitable nuts for connecting the member 44 to the hinge member 48 and with a thumb screw 58 by which the wheel mount is releasably held against vertical swinging movement relative to the element 30 in either position of the element. A wheel R is rotatably mounted on each of the wheel mounts as by means of a suitable axle 60, and a suitable mud guard 62 is provided on each wheel mount.

For the purpose of connecting the boat to a suitable towing vehicle, such as an automobile or truck, the invention includes towing hitch mechanism, generally designated 64, which is removably attached to the bow of the boat, as best illustrated in FIGURES 4 and 5. The towing hitch mechanism comprises a connector member 66, of generally Z shape, having a horizontal arm 68 positioned over the upper edge of the bow of the boat, and hingedly connected at its free end as by means of a hinge 70, having a removable hinge pin 71, to a hinge plate 72 attached to the inner face of the bow. The web of the connector member extends vertically downwardly exterior of the boat and the member has an outer arm 74, extending forwardly away from the boat, and which carries at its outer end a socket element 76, of usual construction adapted to be releasably engaged with a ball element mounted on a towing vehicle V as by means of the usual bracket 78 extending rearwardly from the vehicle. The arm 68 of the connecting member 64 of the hitch mechanism has a perforation 78 through which a vertically extending bolt 80 is extended into the bow of the boat, which bolt is provided at its upper end with a thumb screw 82, by which the arm 68 is releasably clamped against vertically swinging movement.

The member 64 may also be provided with a bolt 84, which extends horizontally through the bow of the boat and is releasably attached thereto, and which limits forward flexing movement of the connecting member when the boat is being towed. The bolt 84 may be surrounded by a coil spring 86 located between the web of the connecting member and the bow of the boat, to yieldingly resist flexing movement of the connecting member toward the boat.

By this construction of the towing mechanism it will be apparent that by removing the bolt 84 and the thumb screw 82 and removable hinge pin 71, the connecting member 64 may be inverted, from the position shown in FIGURE 4 to that illustrated in FIGURE 5, and reconnected to position the socket 76 at a higher elevation for use with a towing vehicle having a hitch connection located at a higher elevation.

In converting a boat for use as a trailer, the wheel mounts are connected to the sides of the boat as illustrated in FIGURE 2, the thumb screws 42 and 58 being securely tightened to rigidly secure the wheel mounts to the supports and the supports to the sides of the boat. With the wheels thus supported in ground engaging position the boat may be connected to a towing vehicle to be towed along the highway.

When the boat has been thus towed to a location for use in the water the thumb screws 42 and 58 may be unscrewed, and the hinge pins 52 may be removed, to disconnect the hinge member 48 from the bracket 50, whereupon the wheel mounts may be swung vertically with the elements 30 into the boat, the wheel mounts being also swung vertically relative to the elements 30 to position the wheels to rest on the bottom of the boat, as shown in dotted lines in FIGURE 2. With the wheel-supports thus positioned in the bottom of the boat the boat is now ready for use in the water.

When it is again desired to tow the boat over the highway, the wheeled supports are again swung outwardly and downwardly from the boat to position the wheels for engagement with the ground as illustrated in FIGURE 2, the hinge pins 52 being reinserted and the thumb screws 42 and 58 being replaced and tightened.

Should it be desired to remove the wheel supports from the boat this may be readily accomplished by merely removing the hinge pins 52 and releasing the bolts 32 to allow the connector members 12 to be lifted off the sides of the boat, whereupon the wheeled supports may be stored in the boat or at any other desired place.

It will thus be seen that the invention, constructed as described above, provides mechanism for converting a boat into a wheeled trailer, which is of simple design and rugged construction, and in which the wheeled supports are readily moved to inactive position within the boat when the boat is to be used on the water.

The invention is disclosed herein in connection with the certain arrangement and construction of the parts but it will be understood that these may be varied to suit the particular type of boat with which the mechanism is to be used.

Having thus clearly shown and described the invention what is claimed as new and desired to secure by Letters Patent is:

In a wheeled support for use on a boat a connector member formed in two parts of flat strip-like material, one of said parts being of angle shape positioned with one arm thereof extending vertically in engagement with the inside face of a side wall of a boat and the other arm thereof extending horizontally across the upper edge of said wall, and the other of said parts being of inverted U-shape positioned with one arm extending vertically downwardly from said upper edge in engagement with the outside face of said wall and the other arm thereof spaced outwardly from said wall, the upper face of the top of said other part being in engagement with the lower face of the horizontally extending arm of said one part externally of said wall, means for connecting said one arm of said one part and said one arm of said other part together in clamping relation to said wall, an elongated element hingedly connected at one end to the outer end of the horizontal arm of said one part for vertical swinging movement to one position extending vertically downwardly exteriorly of the boat in engagement with the outer face of said other arm of said other part and to another position extending laterally inwardly across the upper edge of said wall in engagement with the upper face of said other arm of said one part to be supported in an inwardly horizontally extending position thereby, means for releasably securing the element in said one position to said other arm of said other part, wheel mounting means, a wheel rotatably supported on the mounting means, means hingedly connecting the mounting means to the other end of said element for vertical swinging movement to a position to rotatably support the wheel in engagement with the ground when the element is in said one position and to a position to hold the wheel upright inside of the boat when the element is in said other position, means for releasably connecting the mounting means to the element to hold the mounting means against vertical swinging movement relative to the element when the element is in said one position and means for releasably connecting the element to said other arm of said other part to hold the element against vertical swinging movement when the element is in said one position.

References Cited in the file of this patent

UNITED STATES PATENTS

| | | |
|---|---|---|
| 2,219,254 | Davis | Oct. 22, 1940 |
| 2,421,671 | West | June 3, 1947 |
| 2,578,376 | Smith | Dec. 11, 1951 |
| 2,954,569 | McCord | Oct. 4, 1960 |